June 22, 1954

H. J. SOGN ET AL 2,681,661

VALVE

Filed May 24, 1949

INVENTORS
HAROLD J. SOGN
EUGENE A. HANAWAY
BY
ATTORNEY

Patented June 22, 1954

2,681,661

UNITED STATES PATENT OFFICE 2,681,661

VALVE

Harold J. Sogn and Eugene A. Hanaway,
Oakland, Calif.

Application May 24, 1949, Serial No. 95,026

9 Claims. (Cl. 137—411)

This invention relates to improvements in valves for flushing tanks and other tanks where the valve is to be closed automatically when the level of the fluid in the tank reaches a predetermined point.

This invention solves the problem of noise in the filling of tanks used in flushing closets. Where powder rooms are located close to living quarters, it is possible to flush toilet facilities equipped with the present invention without any perceptible noise as the tank is refilled.

The reason the present invention is able to accomplish this novel and long sought result is because the device closes the valve quickly and does not throttle down the flow gradually, with the hissing noise familiar in present day devices.

This is accomplished by having a float controlled needle valve start to close an orifice in a flexible diaphragm and then having the pressure which builds up in the chamber behind the diaphragm move the orifice against the needle valve with a substantial quick thrust to close the valve. The force of the float tending to move the needle valve in one direction is completely counteracted by the force of the greater pressure applied by the diaphragm on the needle valve so that the diaphragm tends to depress the float. On models of the device tested so far, the diaphragm has built up enough pressure against the needle valve and the actuating float to push the float down into the water about an inch more than normal. How far it depresses the float depends, of course, upon the pressure in the water system serving the home.

The present invention might be characterized as obtaining a compound or double closing movement in the sense that the float lifts the needle valve while the downward pressure on the diaphragm moves the orifice against the needle valve to effect a quick-closing and holding closed of the needle valve on its seat. The closing of the valve does not have to await the slow rising of the float as the water flow is tapered off.

Once the needle valve begins to throttle its diaphragm orifice the diaphragm covering the main inlet orifice moves into closed position with a smooth, quick, damped action. The turning off of the water by this new valve takes only a few seconds and is practically noiseless.

The invention is capable of being incorporated in many different forms of structure, but in compliance with the statutes the structure shown in the following drawings is offered as illustrative and without any intention of limiting the details to this structure, except as required by the appended claims.

Figures 1, 2, 3:
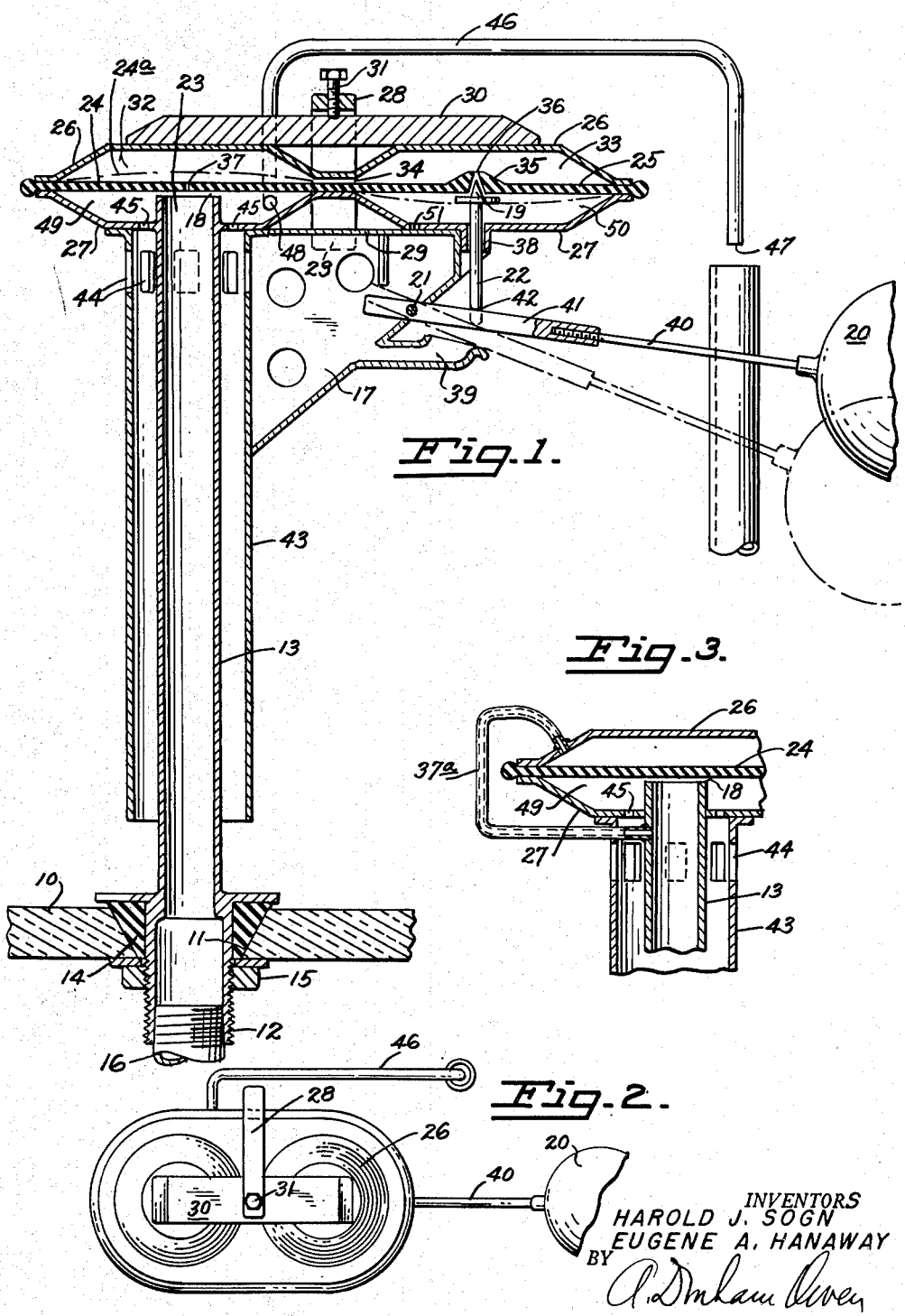
Fig. 1 is a view in elevation and partly in section of the device.
Fig. 2 is a plan view.
Fig. 3 is a cross sectional view in elevation of a modification.

The invention is shown in the drawings as mounted in the tank of a water closet. It may be used in any device in which a predetermined water level within a certain range is desired to be maintained automatically.

In a tank 10 an opening 11 is provided to receive the threaded end 12 of an inlet pipe 13 by means of which water under pressure is introduced into the tank. The inlet pipe 13 is secured in the opening with a suitable packing 14 and a clamping nut 15. A nipple 16 is threaded into the inlet pipe 13.

On the inlet pipe 13 is supported the valve mechanism which includes the frame 17, the main valve at 18 and the needle valve at 19 with the float 20 pivoted at 21 to the frame 17 in position to move and be moved by the needle valve stem 22. The inlet pipe 13 terminates in an outlet orifice 23 positioned to be engaged by the diaphragm 24 when the latter is flexed in a downward direction and to be uncovered by the diaphragm 24 when the diaphragm is flexed in the opposite direction.

The two valves 18 and 19 are mounted in separate chambers and have separate diaphragms 24 and 25 respectively. Actually the material of the diaphragms 24 and 25 may for convenience be a continuous molded element suitably clamped between the housing members 26 and 27. The diaphragm elements may be easily replaced because the upper housing member 26 and the lower housing member 27 are held together by a clamp 28 which engages beneath the frame 17 at 29. The clamp engages the strongback 30 which presses on the top housing member 26. A screw 31 holds the diaphragms 24 and 25 under suitable tension between the two housing members 26 and 27.

When the diaphragms are clamped between the two housing members, the main valve upper chamber 32 is cut off from the needle valve upper chamber 33 except for a small connecting conduit 34. The needle valve diaphragm 25 preferably has a strengthening rim 35 around the orifice 36 into which the needle valve 19 projects. This orifice 36 and needle valve 19 are shown as tapered, but they may be made in any other suitable mating shape. Likewise, the diaphragm 25 may be of the Sylphon bellows or piston type arranged to function in the manner described herein.

The orifice 37 in the main valve diaphragm 24 is in the area embraced by the outlet orifice 23 and preferably is a hole measuring about .003 to .005 inch in diameter. When this diaphragm is closed down on the orifice 23 the diaphragm shuts off the flow of water into the tank through the openings 45 but the hole 37 allows the water pressure to be passed into the two upper chambers 32 and 33 to act on the diaphragms 24 and 25.

The orifice 37 may be omitted from the diaphragm 24, in which case it will completely seal off the orifice 23. In this case, as shown in Fig. 3, there may be a conduit 37a connected between the inlet tube 13 and the upper chamber areas. It is shown connected into the chamber 32, but it could as well connect anywhere in the housing 26 because the chambers 32 and 33 are connected by the conduit 34.

The needle valve stem 22 preferably is loosely mounted in the guide-way 38 so that its sealing end 19 can find a good seating position in the orifice 36. Any fluid passing through the orifice 36 into the chamber 50 will pass between the stem 22 and the guide-way 38 or through the opening 51 and will spill into the catch basin 39 on the frame 17 and will flow down into the tank along the outside of the hush tube 43 so as not to drip directly into the water and cause a dripping noise. In the construction used for illustration, the clearance between the needle valve stem 22 and the guide-way 38 should be about .020 inch. When the lower chamber 50 is omitted, as it may be, the needle valve stem 22 need only be a sliding fit in its guide. However, the form preferred allows the valve member 19 sufficient sidewise motion to align itself with the orifice 36 if these parts should not be concentric.

The float 20 is suspended on the end of a rod 40 pivoted at 21 to the frame 17 and it has a lever 41 with a surface 42 adapted to engage with a minimum of friction against the lower end of the valve stem 22.

To silence the flow of water from the orifice 23 into the tank a hush tube 43 with air ports 44 may be provided around the inlet tube 13. It receives the water which comes through the orifice 23 and through the opening or openings 45.

When this invention is being used in connection with water closets, it is preferable to have a refill tube 46 with one end 47 emptying into the overflow outlet directly into the bowl and with its other end 48 positioned in the chamber 49 to receive water flowing from the orifice 23. The purpose of this tube is to feed enough water into the bowl to bring the water level in the bowl up to the desired level after a flushing operation.

The size of the openings 45 and the tube 46 in relation to the outlet 23 is important for several reasons. It is preferred that the total area of the openings 45 and the tube 46 should be less than the area of the outlet 23 so that the water in the chamber 49 is under some pressure. Not only does this assure a flow of water through the refill tube 46, but the pressure acts to damp the diaphragm 24 as the greater pressure in the chamber 32 and its own resiliency moves it down to close the orifice 23. Sometimes a chattering will result if the water in chamber 49 is not under pressure.

The lower chamber 50 is not absolutely essential to the operation of the device if a support for the needle valve 19 adjacent the diaphragm 25 is provided. From a manufacturing and operational standpoint, the structure of Fig. 1 is presently preferred, but it is not intended to give the impression that the lower chamber 50 is essential to the successful operation of the device.

Operation

Beginning with the tank empty as at the end of a flushing cycle, water entering through the inlet conduit 13 from a suitable source of water supply has forced the diaphragm 24 off the outlet orifice 23 into the dotted line position 24a allowing water to flow out of the outlet 23 into the chamber 49 where it is under some pressure and to flow through the openings 45 into the hush tube 43 and into the tank 10.

Water also is being forced from the chamber 49 through the small orifice 37 (or the conduit 37a in the modification in Fig. 3) into the chamber 32 and through the conduit 34 into the chamber 33 where it passes through the orifice 36 and down around the needle valve stem 22 into the catch basin 39 and then falls into the tank.

When the water level in the tank 10 rises to about the desired level the float 20 will have moved upwardly to the point where the needle valve 19 is entering the orifice 36. As the needle valve begins to close down this orifice the flow of water through the orifice 36 will be impeded; therefore with less water passing through the orifice 36 than is passing through the orifice 37, the water pressure will build up in the chambers 32 and 33 and will cause the diaphragms 24 and 25 to move downwardly. The diaphragm 24 will close over the orifice 23 and the diaphragm 25 will move the orifice 36 against the needle valve 19. The effect of this action by the diaphragm 24 is to stop the water from entering the tank 10 through the orifice 23. The effect on the diaphragm 25 is to make a positive quick seal at the orifice 36 with the needle valve because the pressure of the water on the diaphragm 25 presses the orifice 36 against the needle valve 19 to close the orifice. This downward movement of the diaphragm 25 continues and actually causes the float 20 to be pushed down into the water in the tank. The closing is effected by a compound or double sealing movement, first the lifting of the valve 19 by the float 20 followed as soon as the orifice 36 begins to close by a downward movement of the orifice 36 onto the needle valve 19. These movements combine to effect a quick closing and holding closed of the needle valve 19 in the orifice 36. Once the needle valve 19 is moved up to where it begins to restrict the orifice 36 the closing is completed in a few seconds.

This quick closing is accomplished by having a float controlled needle valve partially close an orifice in a flexible diaphragm, which causes the pressure to build up in the chamber above the diaphragm, which causes the diaphragm to move toward the needle valve. This movement of the orifice toward the float supported needle valve effects a closing action which is quick and silent. It is a result which apparently cannot be achieved, where all the moving is done by the float supported needle valve.

On present day devices one of the reasons for the noise as the filling operation reaches the end of its cycle is the fact that the orifice of the float controlled valve is only slowly closed as the float rises. The noise is generated by the velocity the entering water attains as it is forced through the narrowing opening.

The compound closing movement of the present invention effects the closing of the needle valve almost instantaneously and with practically no detectable sound.

Returning now to the operation of the device when the water is emptied from the tank 10 the float 20 drops in the tank. This pulls the lever 41 away from the needle valve 22. The water pressure in the orifice 36 immediately pushes the needle valve 19 away from the orifice, thereby relieving the pressure in the chambers 32 and 33. This allows the pressure in the conduit 13 to lift the diaphragm 24 from the orifice 23 and the tank begins to fill. As stated at the outset, when the float 20 reaches a predetermined point it will have moved the needle valve 19 partway into the orifice 36 of the diaphragm 25. When this restriction occurs the pressure in the chambers 32 and 33 builds up so that the diaphragm 24 flexes downwardly to close the orifice 23 on the main water supply and as the water pressure continues to enter through the orifice 37, or through the conduit 37a (Fig. 3), into the chamber 33 it causes the diaphragm 25 to move downwardly and to meet the upwardly moving needle valve 19.

While the conventional ball and arm form of float have been shown, any other type of float mechanism may be employed so long as it imparts to the needle valve 19 a lift when it is desired to restrict the orifice 36 and eventually close it and which will release the needle valve 19 when the water level in the tank drops below a predetermined point.

Where the invention is used in a water closet, water from the chamber 49 enters the refill tube 46 at its opening 48 and empties from the outlet 47 into the over-flow pipe of the bowl so as to bring the level of the water in the bowl to a predetermined point. The pressure maintained in the chamber 49 whenever the orifice 23 is uncovered forces the water through the refill tube 46 and the pressure also serves as a cushion or damping means to eliminate any chatter as the diaphragm 24 seats on the orifice 23.

What is claimed is:

1. In a valve mechanism for filling a tank with liquid to a predetermined level, the combination of: a first valve housing; a first flexible diaphragm mounted therein to divide said housing into an upper chamber and a lower chamber, said lower chamber having outlet means therein emptying into said tank; an inlet conduit opening into said lower chamber, the outlet orifice of said conduit being engaged and closed by said diaphragm when said diaphragm is flexed downwardly and being uncovered and opened when said diaphragm is flexed upwardly; means forming a small restricted passageway through which liquid from said inlet conduit may pass into said upper chamber; a second valve housing; a second flexible diaphragm mounted therein dividing said second housing into an upper chamber and a lower portion, said lower portion having an outlet emptying into said tank, said second diaphragm having an orifice therethrough; a needle valve mounted in a guide way in said lower housing portion and having its valve portion movable to open, to restrict, and to close said orifice in said second diaphragm; float means in said tank adapted to move and to be moved by said needle valve; and a conduit of restricted area connecting together the upper chambers of said first and second housings.

2. The device of claim 1 in which the outlet from said lower chamber has less capacity than said inlet conduit so that the fluid in said lower chamber is under pressure whenever said conduit orifice is uncovered by said first diaphragm.

3. The device of claim 1 in which said small restricted passageway comprises a small opening through said first diaphragm in the portion encircled by said outlet orifice when said orifice is in engagement with said diaphragm.

4. The device of claim 1 in which said small restricted passageway comprises a tube leading from said inlet conduit through said first housing to the upper chamber thereof.

5. In a valve mechanism for filling a tank to a predetermined level, the combination of first and second chambers each having a flexible diaphragm forming one face thereof, the diaphragm forming the face of said second chamber having a perforation therethrough; a small conduit of restricted area connecting said chambers together; a liquid conduit having its outlet positioned adjacent the diaphragm forming the face of the first chamber, on the side opposite said first chamber, said diaphragm being adapted to seal said outlet when flexed in one direction and to uncover said outlet when flexed in the other direction; means forming a small passageway of restricted cross-section through which liquid from said conduit may at all times pass into said first chamber; a needle valve supported adjacent the diaphragm forming the face of said second chamber, on the side opposite from said second chamber, in line with said perforation; float means adapted to move said needle valve to restrict said perforation when the liquid in said tank reaches a predetermined level thereby causing pressure to build up in said second chamber and forcing said second chamber diaphragm down onto said valve, closing said valve; and a third chamber for which said first chamber diaphragm forms one face, in which said conduit outlet is enclosed and, when uncovered, empties into said third chamber having openings through which the liquid flows to fill the tank, said openings being of less total capacity than the capacity of said conduit, whereby the liquid in said third chamber is under pressure at all times when said first chamber diaphragm is being forced onto its seat on the end of said conduit.

6. In a valve mechanism for stopping the flow under pressure of liquid through an inlet pipe having an outlet orifice, the combination of: a pair of interconnected valves; the first said valve including a movable, pressure-sensitive, closing means adapted to seat on said inlet orifice when the pressure exerted on said means on the side opposite said orifice exceeds the pressure exerted on it on said orifice side; the second said valve including a first movable valve member and a second movable pressure-sensitive, complementary valve member; housing means cooperating with said pressure-sensitive closing means to form a first chamber on the same side of said closing means as said orifice and a second chamber on the opposite side of said closing means from said orifice; housing means cooperating with said second movable valve member to form a third chamber on the opposite side of said second movable valve member from said first movable valve member; a small conduit of restricted cross-section connecting said second and third chambers; a small passageway of restricted cross section through which liquid from said inlet pipe passes into said second chamber; and means for moving said first valve member to diminish the flow of liquid through said movable complementary valve member, whereby the pressure of the liquid in both said second and third chambers increases and effects movement first of said movable complementary valve member onto said first movable valve member and then of said movable pressure-sensitive closing member on said orifice.

7. The device of claim 6 in which the housing enclosing said orifice and the orifice-contacting side of said perforated, movable, pressure-sensitive, closing means has outlet means of less fluid capacity than said orifice, whereby pressure against said closing member is maintained in said housing whenever said closing member is away from said orifice.

8. In a quietly operating valve mechanism for filling a tank and a bowl with liquid to a predetermined level, the combination of: a first valve housing; a first flexible diaphragm mounted generally horizontally therein to divide said housing into an upper chamber and a lower chamber, said lower chamber having first and second outlet means therefrom; a generally vertical inlet conduit opening into said lower chamber, the outlet orifice of said conduit being engaged and closed by said diaphragm when said diaphragm is flexed downwardly and being uncovered and opened by said diaphragm when said diaphragm is flexed upwardly, said inlet conduit having greater capacity than both said lower chamber outlet means together, so that the liquid in said lower chamber is under pressure whenever said conduit orifice is uncovered; a generally vertical hush tube of greater diameter than said conduit and generally concentric therewith, open at its lower end into said tank with air ports near its upper end, said first lower chamber outlet means opening into its upper end; a refill tube for said bowl leading from said second outlet means; means forming a small restricted passageway through which liquid from said inlet conduit may pass into said upper chamber whether or not liquid is passing from said inlet conduit into said lower chamber; a second valve housing; a second flexible diaphragm mounted therein dividing said second housing into a second upper chamber and a second lower chamber, said second lower chamber having an outlet for emptying liquid onto the outside of said hush tube, said diaphragm having an upwardly tapered orifice therethrough; a tapered needle valve mounted with clearance in a guide way in the lower housing portion and having its valve portion movable to open, to restrict, and to close said orifice in said second diaphragm; float means in said tank adapted to move and to be moved by said needle valve; and a conduit of restricted area connecting together the upper chambers of said first and second housings.

9. In a quietly operating valve mechanism for filling a tank with liquid to a predetermined level, the combination of: a first valve housing; a second valve housing; a flexible diaphragm mounted generally horizontally therein to divide each of said housings into a respective upper chamber and lower chamber, each of said lower chambers having outlet means therein emptying into said tank; a generally vertical inlet conduit opening into the lower chamber of said first housing the outlet orifice of said conduit being engaged and closed by said diaphragm when said diaphragm is flexed downwardly and being uncovered and opened by said diaphragm when said diaphragm is flexed upwardly, said inlet conduit having greater capacity than the outlet means of said first lower chamber, so that the liquid in said lower chamber is under pressure whenever said conduit orifice is uncovered; means forming a small restricted passageway about 0.003 inch to 0.005 inch in diameter through which liquid from said inlet conduit may pass into the upper chamber in said first housing, whether or not liquid is passing from said inlet conduit into said first lower chamber; an upwardly tapered orifice through said diaphragm in said second valve housing; a tapered needle valve mounted with clearance of about 0.02 inch in a guide way in the lower portion of said second housing and having its valve portion movable to open, to restrict, and to close said orifice through said second diaphragm; float means in said tank adapted to move and to be moved by said needle valve; and a conduit of restricted area connecting together the upper chambers of said first and second housings.

References Cited in the file of this patent

UNITED STATES PATENTS

| Number | Name | Date |
|---|---|---|
| 551,577 | Chamberlain | Dec. 17, 1895 |
| 1,248,650 | Gustafson | Dec. 4, 1917 |
| 1,426,093 | Owens | Aug. 15, 1922 |
| 2,213,753 | Teahen | Sept. 3, 1940 |
| 2,328,323 | Bowers | Aug. 31, 1943 |
| 2,598,195 | Smith | May 27, 1952 |